（12） United States Patent
Kim

(10) Patent No.: US 7,336,978 B2
(45) Date of Patent: Feb. 26, 2008

(54) MOBILE DEVICE HAVING AN OVERCURRENT CUTOFF FUNCTION

(75) Inventor: Ji-sang Kim, Hwaseong-gun (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 333 days.

(21) Appl. No.: 10/787,157

(22) Filed: Feb. 27, 2004

(65) Prior Publication Data

US 2004/0176146 A1   Sep. 9, 2004

(30) Foreign Application Priority Data

Mar. 5, 2003   (KR) ............... 10-2003-0013816

(51) Int. Cl.
*H04B 1/38*   (2006.01)
(52) U.S. Cl. ............... 455/574; 455/571; 455/572; 455/573; 455/343.1; 455/343.2; 455/343.5; 455/343.6; 320/114; 320/134; 320/136; 320/140; 307/66
(58) Field of Classification Search .. 455/343.5–343.6, 455/127.1, 127.5, 571–572, 574, 556.1–556.2, 455/117, 217, 343.1–343.2, 522, 343.3; 340/636.1; 320/114, 134, 137, 138, 140, 166, 168
See application file for complete search history.

(56) References Cited

U.S. PATENT DOCUMENTS

| 4,761,824 | A | * | 8/1988 | Saito | 455/127.1 |
| 5,239,695 | A | * | 8/1993 | Jung | 455/126 |
| 5,834,857 | A | * | 11/1998 | Abe et al. | 455/343.5 |
| 5,862,493 | A | * | 1/1999 | Barkat et al. | 455/572 |
| 5,995,808 | A | * | 11/1999 | Hasegawa | 455/572 |
| 6,233,464 | B1 |  | 5/2001 | Chmaytelli | 455/556 |
| 6,526,294 | B1 | * | 2/2003 | Banh et al. | 455/573 |
| 7,136,682 | B2 | * | 11/2006 | Lin | 455/575.1 |
| 2001/0017532 | A1 | * | 8/2001 | Han | 320/114 |
| 2002/0039916 | A1 | * | 4/2002 | Hosoi | 455/572 |
| 2003/0109243 | A1 | * | 6/2003 | Chang et al. | 455/574 |

FOREIGN PATENT DOCUMENTS

KR   2002-77293   10/2002

* cited by examiner

*Primary Examiner*—Rafael Perez-Gutierrez
*Assistant Examiner*—Olumide Ajibade-Akonai
(74) *Attorney, Agent, or Firm*—Staas & Halsey LLP

(57) ABSTRACT

A mobile device having an overcurrent cutoff function. In a mobile device having at least one function module, the mobile device includes a main power supply which supplies power to the mobile device, a power detection unit which detects whether power from the main power supply to the mobile device is cut off, and generates a power cutoff signal when the power is cut off, a backup power supply unit which supplies a backup power to the mobile device when the power from the main power supply to the mobile device is cut off, and a control unit which converts potential levels of the data lines and control signal lines between the control unit and the function module to a predetermined potential level in response to the power cutoff signal. Such a mobile device can minimize the consumption of the backup battery built into the mobile device when the main battery supplying main power to the mobile device is detached from the mobile device, to thereby extend the time for preserving data stored in the mobile device due to the minimized consumption of the backup battery.

12 Claims, 5 Drawing Sheets

MOBILE DEVICE HAVING AN OVERCURRENT CUTOFF FUNCTION

CROSS-REFERENCE TO RELATED APPLICATIONS

This application claims the benefit of Korean Patent Application No. 2003-13816, filed on Mar. 5, 2003, in the Korean Intellectual Property Office, the disclosure of which is incorporated herein by reference.

BACKGROUND OF THE INVENTION

1. Field of the Invention

The present invention relates to a mobile device, and more particularly, to a mobile device and a method capable of minimizing the discharges of a backup power supply which provides backup electric power to the mobile device when a main battery is detached from the mobile device.

2. Description of the Related Art

In general, mobile devices such as PDAs, cellular phones, and so on, operate with a battery that can be loaded and unloaded in and out of the mobile devices, and have a backup battery to preserve data stored in a memory device built into the mobile devices when the battery is detached from the mobile device due to external impacts. The backup battery is generally charged with a voltage supplied by the battery, and the output current rate of the backup battery does not exceed several tenths of a mA, and the backup battery runs out in merely a few hours.

FIG. 1 is a block diagram illustrating an operation of a backup battery for a conventional PDA.

In FIG. 1, the conventional Personal Digital Assistant (PDA) includes a Code Division Multiple Access (CDMA) module 10, a control unit 20, a Dynamic Random Access Memory (DRAM) 30, and a backup battery 40. The PDA further includes a display unit, an I/O interface unit, and so on, however these components are omitted since they are not necessary to explain the operation of the backup battery.

The CDMA module 10 is built into the PDA, but may be loaded into and unloaded out of the PDA depending upon the type of PDA. Although FIG. 1 shows an implementation of a CDMA module 10 with a communication function, other types of function modules, such as a wireless LAN card or a television tuner may also be adequately used.

The control unit 20 includes application programs and an operating system, and runs the application programs or controls the CDMA module 10. That is, when the CDMA module 10 is not used, the control unit 20 can turn the CDMA module 10 off with an application of a control signal P_OFF to the CDMA module 10. However, it takes a considerable amount of time to notify a base station (not shown) of the cutoff of electric power to the CDMA module 10 and to turn the CDMA module 10 off.

The DRAM 30 stores temporary data during application program executions by the control unit 20 and data resulting from the application program executions by the control unit 20. The DRAM 30 is low in cost compared to SRAM or Flash ROM, therefore the DRAM is widely used in mobile devices such as PDAs. However, the DRAM has a disadvantage of losing all its data stored therein when the electric power is cutoff.

In the conventional PDA mentioned above, when the main battery is detached from the PDA due to external impacts during data communications between the control unit 20 and the CDMA module 10, the backup battery 40 supplies power to the DRAM 30 and the control unit 20. When the CDMA module 10 and the control unit 20 have been in data communications and communication data has been in a logic "high", the backup battery 40 runs out due to a load RL of the CDMA module 10.

When the main battery (not shown) which supplies power to the CDMA module 10 and the control unit 20 is detached from the PDA, current consumption occurs during a period of time ranging from a few milliseconds to a few tenths of a millisecond in data lines and control signal lines data/control which are wired between the control unit 20 and the CDMA module 10.

When the control unit 20 communicates data with a function module such as the CDMA module 10 consuming large currents and communication data is mainly formed in a logic "high", more current is consumed. Accordingly, there exists a problem in that the backup battery 40 with a current rate of a few tenths of a mA in general, can preserve the data stored in the DRAM 30 for less time, depending upon the amount of discharge currents by the CDMA module 10.

SUMMARY OF THE INVENTION

Accordingly, it is an aspect of the present invention to provide a mobile device and method capable of minimizing the discharges of a backup power supply which provides backup electric power to the mobile device when a main battery is detached from the mobile device.

Additional aspects and/or advantages of the invention will be set forth in part in the description which follows and, in part, will be obvious from the description, or may be learned by practice of the invention.

The foregoing and/or other aspects are achieved by providing a mobile device having an overcurrent cutoff function and at least one function module, the mobile device comprising a main power supply which supplies power to the mobile device, a power detection unit which detects whether power from the main power supply to the mobile device is cut off and generates a power cutoff signal when the power is cut off, a backup power supply unit which supplies a backup power to the mobile device when the power from the main power supply to the mobile device is cut off, and a control unit which communicates data signals and control signals with the at least one function module and converts potential levels of the data lines and control signal lines connected to the function module to a predetermined potential level in response to the power cutoff signal.

The control unit comprises a flash ROM storing programs for driving the at least one function module, a microprocessor driven by the programs, which communicates data with the at least one function module and applies output power of the backup power supply unit to the mobile device in response to the power cutoff signal, and a level conversion unit which converts the potential levels of the data lines and control signal lines to the predetermined potential level in response to the power cutoff signal.

The level conversion unit comprises a switch and a pull-down resistor, wherein the switch is turned on in response to the power cutoff signal.

The level conversion unit comprises NMOS transistors connected in series between the microprocessor and the at least one function module and turn on and off in response to the power cutoff signal.

The power detection unit comprises a slide switch having first, second, and third terminals, wherein the second and third terminals are connected in common, a first resistor connected between the first terminal and the main power supply and a second resistor connected between the third terminal and the ground, wherein a node connected to the third terminal forms an output terminal for outputting the power cutoff signal.

The predetermined potential level is either a logic "low" or a high-impedance state.

It is another aspect of the present invention to provide an overcurrent control method for a mobile device having at least one function module, the method comprising detecting whether a main power supply supplying power to the mobile device is cut off, converting potential levels of input/output signal lines of the at least one function module to a predetermined potential level according to a result of the detection, and supplying a backup power to the mobile device.

The predetermined potential level is either a logic "low" or a high-impedance state.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
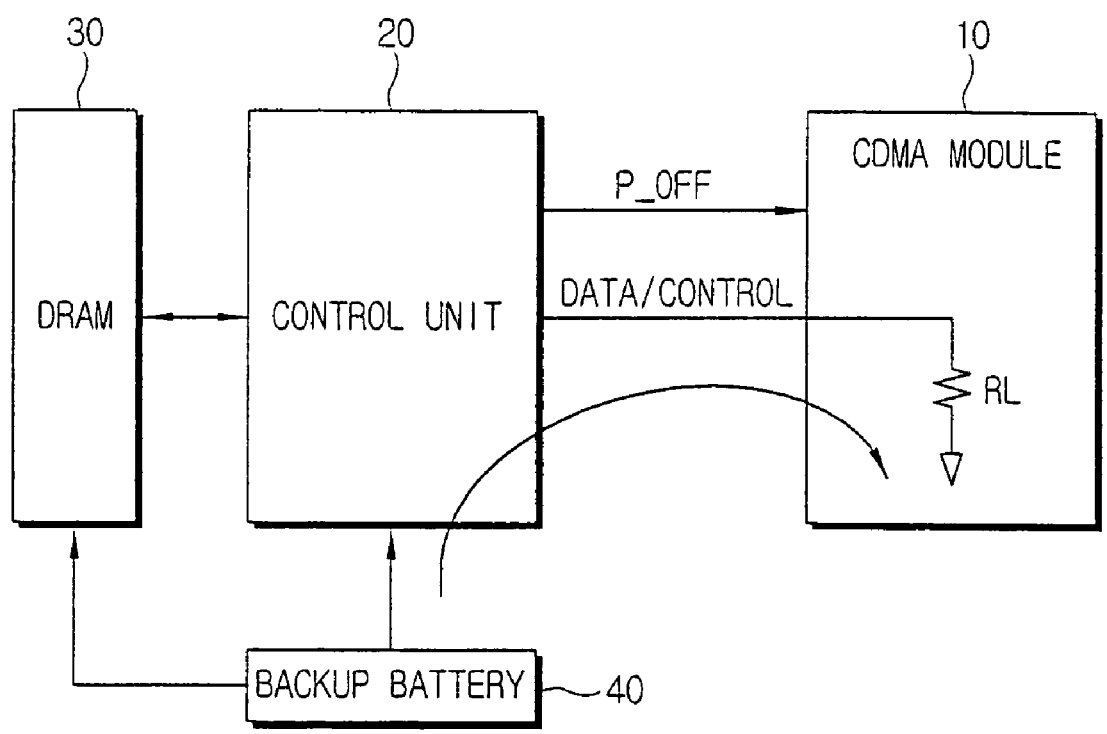
FIG. 1 is a block diagram of a backup battery in conventional PDAs.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 2:
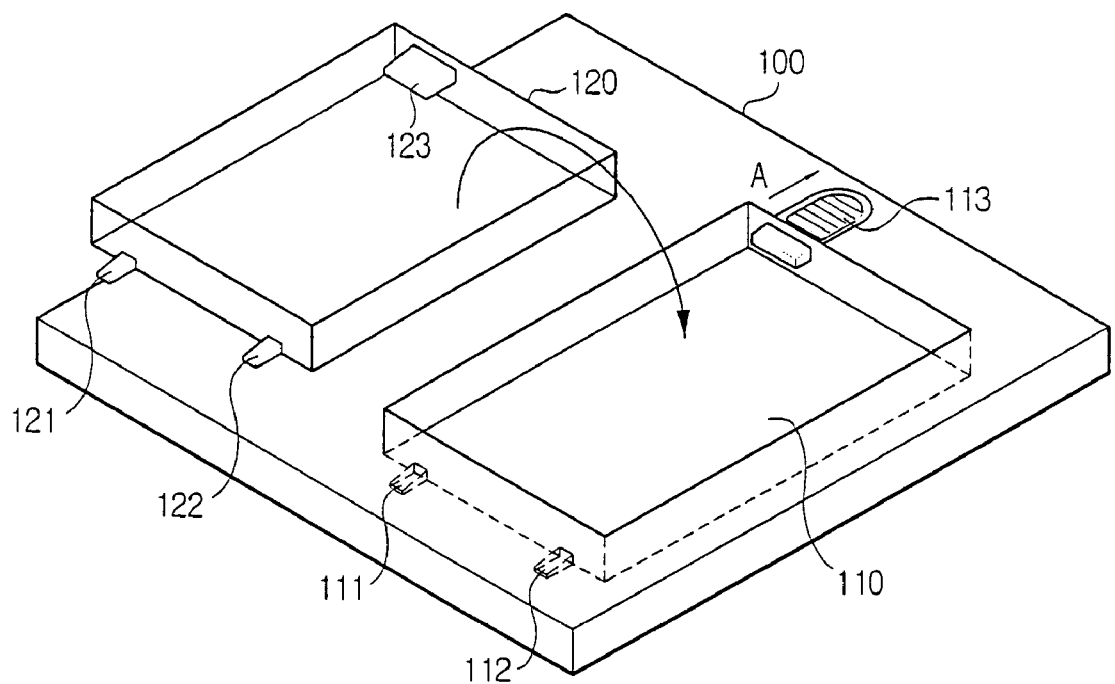
FIG. 2 is a view illustrating a battery cavity and a battery pack for a mobile device according to an embodiment of the present invention.

FIG. 2 is a view illustrating a battery cavity and a battery pack for a mobile device according to an embodiment of the present invention.

In FIG. 2, a battery cavity 110 for a mobile device 100 comprises a first engagement protrusion 111, a second engagement protrusion 112, and a separation button 113, and a battery pack 120 comprises a first protrusion 121, a second protrusion 122, and a button groove 123.

The first engagement protrusion 111 is engaged with the first protrusion 121, the second engagement protrusion 112 is engaged with the second protrusion 122, and the separation button 113 is engaged with the button groove 123. Accordingly, unless the separation button 113 is pulled in a direction A after the battery pack 120 is engaged with the battery cavity 110, the battery pack 120 is not separated from the battery cavity 110. When external impacts are applied to the mobile device 100 having the battery pack 120 and the battery cavity 110 as constructed above, the battery pack 120 can be separated due to the malfunction of the separation button 113. The separation button 113 first moves in the direction A before the battery pack 120 is separated from the battery cavity 110, causing a control signal (not shown) to be generated, which indicates that the battery pack 120 is separated from the battery cavity 110.

Figure 3:
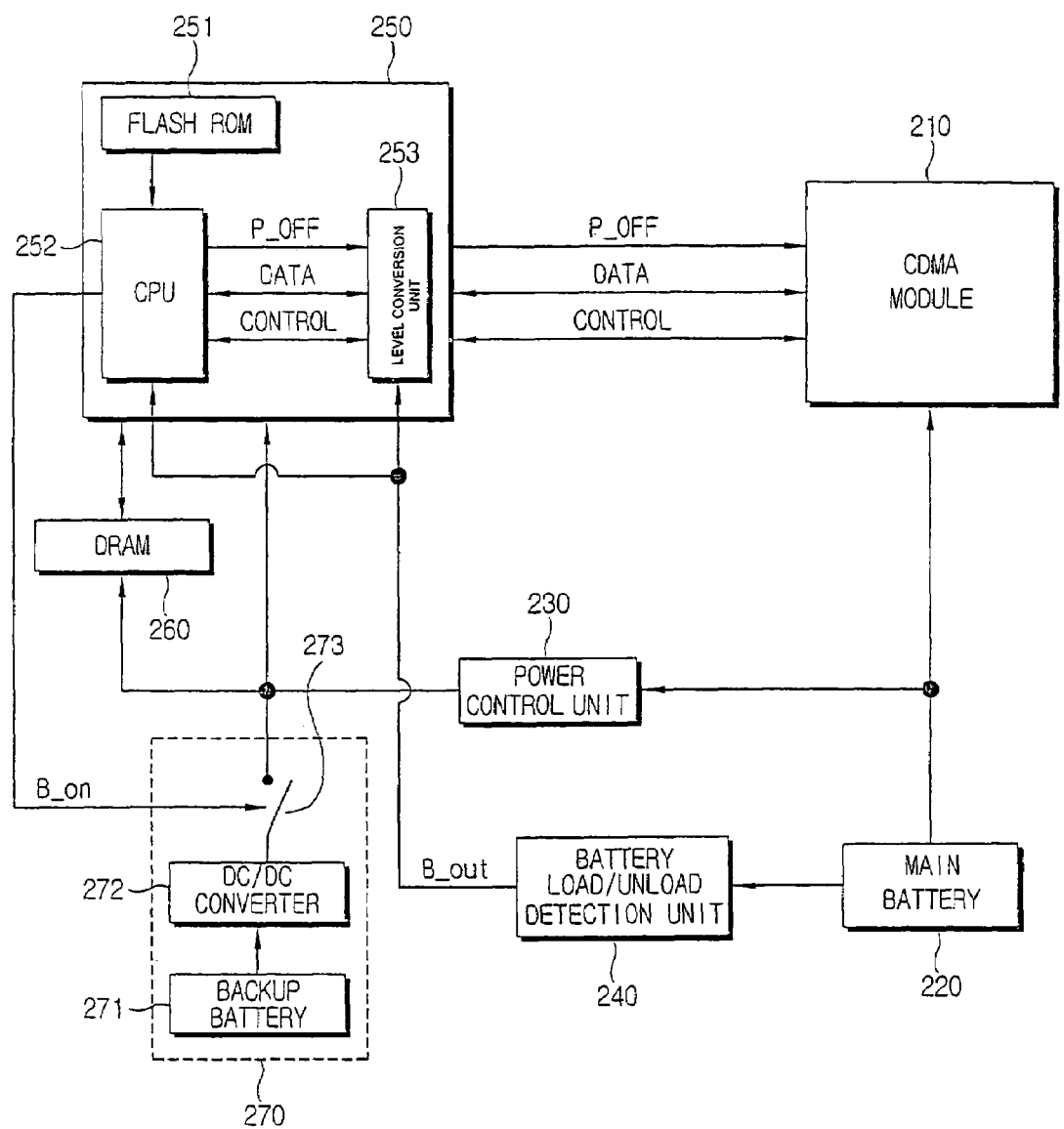
FIG. 3 is a block diagram illustrating a mobile device having an overcurrent cutoff function according to an embodiment of the present invention.

FIG. 3 is a block diagram illustrating a mobile device having an overcurrent cutoff function according to an embodiment of the present invention.

The mobile device of FIG. 3 comprises a CDMA module 210, a main battery 220, a power control unit 230, a battery load/unload detection unit 240, a control unit 250, a DRAM 260, and a backup power supply unit 270.

The CDMA module 210 is built into a PDA, however it may be loaded into and unloaded out of the PDA depending upon the type of PDA. FIG. 3 shows an example of a PDA comprising a CDMA module having a communication function. However, other kinds of function modules, such as a wireless LAN card or a television tuner, can also be used.

The main battery 220 supplies power to the mobile device. In general, the main battery 220 can be loaded into and unloaded out of a mobile device.

The power control unit 230 is applied with power outputted from the main battery 220, converts the power into a predetermined voltage, and supplies the voltage to the control unit 250 and a DRAM 260.

When the main battery 220 is separated from the mobile device, that is, the main battery 220 is separated from the mobile device due to external impacts or user's mistakes for example, the battery load/unload detection unit 240 detects the separation, and generates a power cutoff signal B_out of a logic "low". The power cutoff signal B_out is generated when the separation button 113 moves in the direction of A shown in FIG. 2.

The control unit 250 comprises application programs and an operating system, and runs the application programs or controls the CDMA module 210. Further, in response to the power cutoff signal B_out generated from the battery load/unload detection unit 240, the control unit 250 converts the potential levels of the data lines and control lines that are associated with the CDMA module 210 into a logic "low" or a high impedance state, and then generates a backup power supply enable signal B_on to enable the backup power supply unit 270 to supply power. When the CDMA module 210 is not used, the control unit 250 applies a control signal P_OFF to the CDMA module 210 to turn the CDMA module 210 on and off. It takes a considerable amount of time to notify a base station (not shown) of the cutoff of electric power to the CDMA module 210, and to turn the CDMA module 210 off.

The DRAM 260 stores temporary data during an execution of the application programs by the control unit and the data resulting from the execution of the application programs by the control unit. The DRAM 260 is low in cost compared to SRAM or Flash ROM, therefore the DRAM is widely used in mobile devices such as PDAs. However, the DRAM loses all its data stored therein upon the electric power cutoff.

The backup power supply unit 270 comprises a backup battery 271, a DC/DC converter 272, and a switching unit 273. The backup power supply unit 270 supplies to the control unit 250 and the DRAM 260 the power supplied from the backup battery 271 according to the switching unit 273 in response to the backup power supply enable signal B_on. The DC/DC converter 272 then converts the voltage of the backup battery 271 into a voltage necessary for the control unit 250 or the DRAM 260.

The control unit 250 comprises a Flash ROM 251, a microprocessor (CPU) 252, and a level conversion unit 253.

The Flash ROM 251 stores therein an operating system for driving the mobile device and application programs such as schedule management programs, multimedia reproducing/recording programs, communication programs, and so on. In general, Arm Linux, Windows Ce, Palm OS, or the like may be used for the operating system stored in the Flash ROM 251.

The microprocessor (CPU) 252 is driven based on the operating system and application programs built into the Flash ROM 251, and controls the operations of the CDMA module 210 in response to an input signal inputted from an input device such as a touch screen (not shown), and stores data inputted from the input device in the DRAM 260 data inputted from the input device.

The level conversion unit 253 is disposed between the data lines and the control signal lines between the microprocessor (CPU) 252 and the CDMA module 210, and turns the data lines and the control signal lines on and off, and converts the potential levels of the data lines and the control signal lines into a logic "low".

Figure 4A:
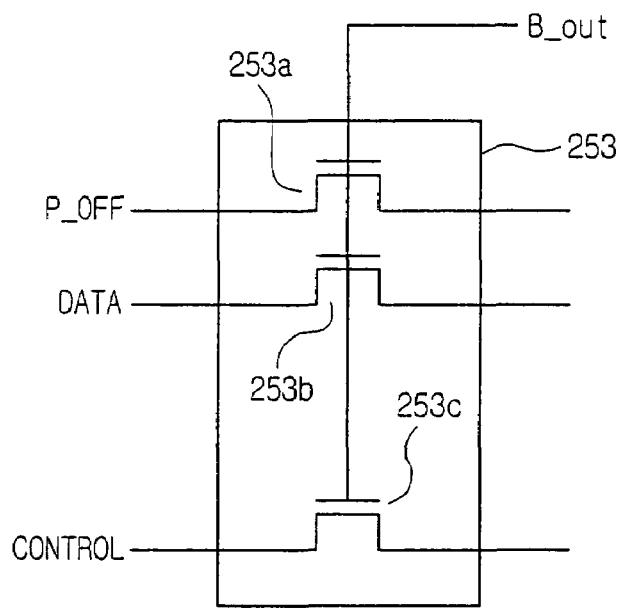
FIG. 4A is a view illustrating the level conversion unit of FIG. 3 according to an embodiment of the present invention.

FIG. 4A is a view illustrating the level conversion unit 253 of FIG. 3 according to an embodiment of the present invention.

Figure 4B:
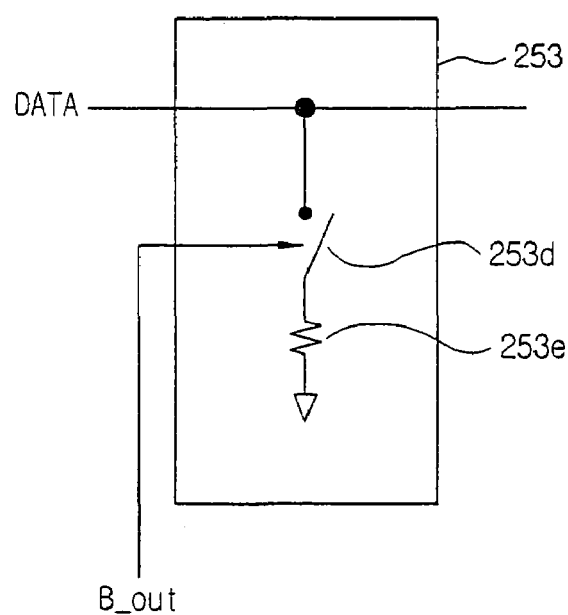
FIG. 4B is a view illustrating the level conversion unit of FIG. 3 according to another embodiment of the present invention.

The level conversion unit 253 shown in FIG. 4A is implemented with NMOS transistors 253a, 253b, and 253c connected in series between the data lines and the control signal lines which are wired between the microprocessor (CPU) 252 and the CDMA module 210, and each of the NMOS transistors 253a, 253b, and 253c is constructed to be turned on and off by a power cutoff signal. Since the power cutoff signal B_out generates a logic "low" when the main battery 220 is detached from the mobile device, the respective NMOS transistors 253a, 253b, and 253c are turned off when the battery is detached, so the data lines and the control signal lines connected to the sources and drains of the NMOS transistors 253a, 253b, and 253c have a high impedance state. Accordingly, the current consumption of the CDMA module 210 is cut off by logic "high" data lines and control signal lines out of the data lines and control lines, and, after the respective data lines and control signal lines are turned into the high impedance state by the level conversion unit 253, the microprocessor (CPU) 252 applies an output voltage of the backup power unit 270 to the DRAM 260 and the control unit 250. FIGS. 3, 4A and 4B show only one data line and one control signal line to help readers understand the present invention, however, a plurality of data lines and control signal lines are generally provided. For example, when the microprocessor (CPU) 252 communicates data in a 32-bit unit, 32 data lines are provided.

FIG. 4B is a view illustrating the level conversion unit 253 of FIG. 3 according to another embodiment of the present invention.

The level conversion unit 253 comprises a switch 253d and a pull-down resistor 253e that are connected in series between the ground and the data lines and control signal lines which are wired between the microprocessor (CPU) 252 and the CDMA module 210. FIG. 4B shows only the data line connected with the microprocessor (CPU) 252, but can be equally applied to the control signal lines and the control signal P_OFF for this embodiment of the present invention.

The switch 253d is turned on, that is, short-circuited in response to the power cutoff signal B_out, which thrusts the potential levels of the data lines and control signal lines into a logic "low". Accordingly, all the data lines and control signal lines that are connected between the microprocessor (CPU) 252 and the CDMA module 210 have the logic "low", and, after the logic levels of the data lines and control signal lines have the logic "low", the microprocessor (CPU) 252 applies the power of the backup power supply unit 270 to the DRAM 260 and the control unit 250. The control unit 250 then consumes a minimum amount of power necessary to maintain a standby state, allowing the backup power supplied by the backup power supply unit 270 to last for an extended period of time since all the data lines and control signal lines connected to the CDMA module 210 have a logic "low". Likewise, a storage time for data stored in the DRAM 260 by the mobile device is also extended.

Figure 5:
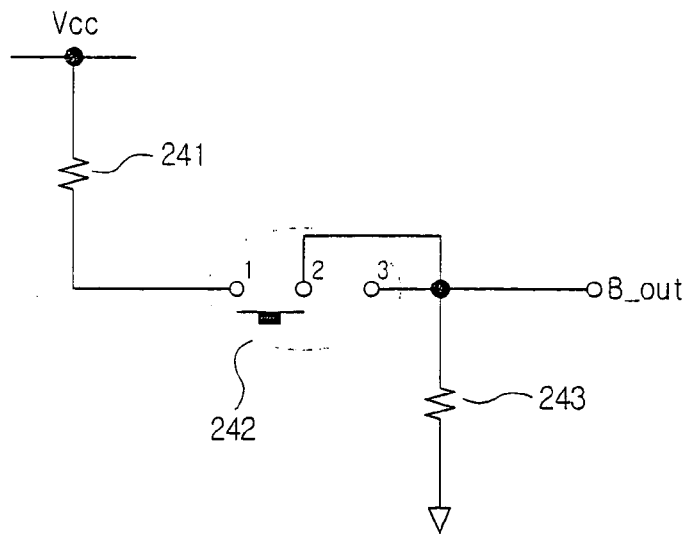
FIG. 5 is a view illustrating the battery load/unload detection unit of FIG. 3 according to an embodiment of the present invention.

FIG. 5 is a view illustrating a circuit of the battery load/unload detection unit 240 of FIG. 3 according to an embodiment of the present invention.

The battery load/unload detection unit 240 of FIG. 3 has a three-terminal slide switch 242 provided with a first terminal 1, a second terminal 2, and a third terminal 3, and resistors 241 and 243.

The slide switch 242 electrically connects the first terminal 1 and the second terminal 2, and interacts with the separation button 113 shown in FIG. 2. For example, when the separation button 113 moves in the direction A, the slide switch 242 electrically connects the second terminal 2 and the third terminal 3, so the potential level of the power cutoff signal B_out turns into a logic "low" since the signal B_out is discharged to the ground through the resistor 243. Accordingly, the level conversion unit 253 shown in FIG. 4A and FIG. 4B converts the potential levels of the data lines and control signal lines connected between the microprocessor (CPU) 252 and the CDMA module 210 into a logic "low" or a high-impedance state.

Figure 6:
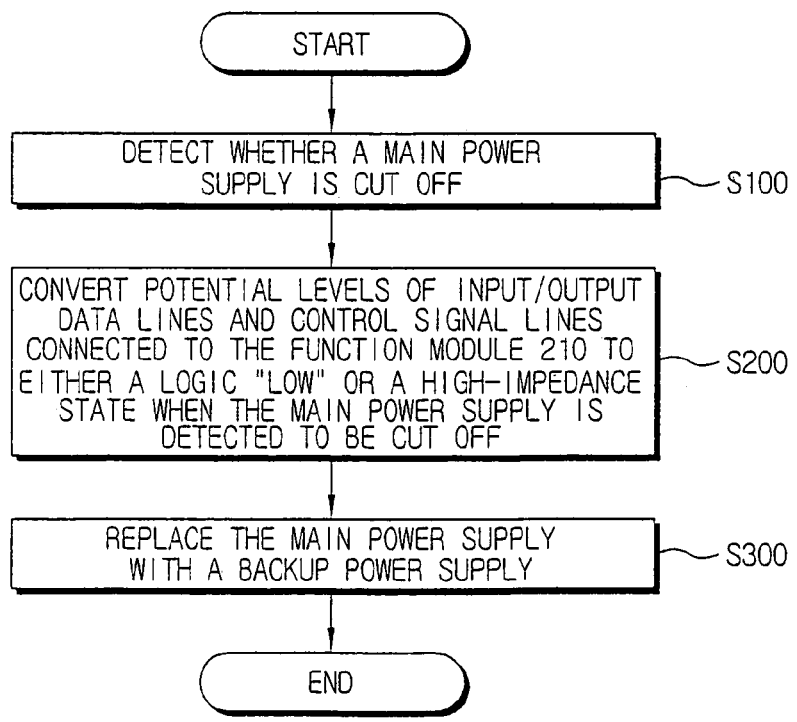
FIG. 6 is a flow chart for showing an overcurrent control method for a mobile device according to an embodiment of the present invention.

FIG. 6 is a flow chart for showing an overcurrent control method for a mobile device according to an embodiment of the present invention.

First, when the separation button 113 moves in the direction A due to external impacts or user's carelessness as shown in FIG. 2, the battery load/unload detection unit 240 detects the movement, and generates the power cutoff signal B_out (operation S100). Next, when the power cutoff signal B_out is generated, the level conversion unit 253 converts the potential levels of the data lines and control signal lines connected between the microprocessor (CPU) 252 and the CDMA module 210 into a logic "low" or a high-impedance state (operation S200). Accordingly, the output power of the backup power supply unit 270 is applied to the control unit 250 and the DRAM 260 when the main battery 220 is detached from the mobile device, wherein the output power of the backup power supply unit 270 is not consumed in the CDMA module 210 and the control unit 250.

Lastly, the microprocessor (CPU) 252 responding to the power cutoff signal B_out outputs the backup power supply enable signal B_on to the switch 273, and the switch 273 is short-circuited. Accordingly, the backup power outputted from the backup battery 271 is converted to a predetermined voltage in the DC/DC converter 272, and the voltage is applied to the control unit 250 and the DRAM 260 (operation S300). Accordingly, the backup power supply unit 270 supplies the output power necessary only to preserve data stored in the DRAM 260 and to maintain a standby state of the control unit 250, and, when the main battery is detached from the mobile device, the backup power supply unit 270 does not consume unnecessary currents due to the CDMA module 210, so that the data stored in the DRAM 260 can last for an extended period of time.

The present invention minimizes the consumption of current of the backup battery built into a mobile device when the main battery supplying main power to the mobile device is detached from the mobile device, to thereby extend the time for preserving data stored in the mobile device due to the minimized consumption of the backup battery.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A mobile device having an overcurrent cutoff function and at least one function module, the mobile device comprising:
    a main power supply which supplies power to the mobile device;
    a power detection unit which detects whether power from the main power supply to the mobile device is cut off, and generates a power cutoff signal when the power is cut off;
    a backup power supply unit which supplies a backup power to the mobile device when the power from the main power supply to the mobile device is cut off; and
    a control unit comprises application programs and an operating system, and runs the application programs or controls the at least one function module, and communicates data lines and control signal lines with the at least one function module, and converts potential levels of the data lines and control signal lines connected with the at least one function module to a predetermined potential level in response to the power cutoff signal and then generates a backup power supply enable signal to enable the backup power supply unit to supply power, wherein the control unit further comprises:
    a flash ROM which stores the application programs to drive the at least one function module;
    a microprocessor driven by the application programs, and which communicates data with the function module and applies an output power of the backup power supply unit to the mobile device in response to the power cutoff signal; and
    a level conversion unit which converts the potential levels of the data lines and control signal lines to the predetermined potential level in response to the power cutoff signal.

2. The mobile device of claim 1, wherein the level conversion unit comprises a switch and a pull-down resistor, wherein the switch is turned on in response to the power cutoff signal.

3. The mobile device of claim 1, wherein the level conversion unit comprises NMOS transistors connected in series between the microprocessor and the function module, and which turn on and off in response to the power cutoff signal.

4. A mobile device having an overcurrent cutoff function and at least one function module, the mobile device comprising:
    a main power supply which supplies power to the mobile device;
    a power detection unit which detects whether power from the main power supply to the mobile device is cut off, and generates a power cutoff signal when the power is cut off;
    a backup power supply unit which supplies a backup power to the mobile device when the power from the main power supply to the mobile device is cut off; and
    a control unit comprises application programs and an operating system, and runs the application programs or controls the at least one function module, and communicates data lines and control signal lines with the at least one function module, and converts potential levels of the data lines and control signal lines connected with the at least one function module to a predetermined potential level in response to the power cutoff signal and then generates a backup power supply enable signal to enable the backup power supply unit to supply power,
    wherein the power detection unit comprises:
    a slide switch having first, second, and third terminals, wherein the second and third terminals are connected in common;
    a first resistor connected between the first terminal and the main power supply; and
    a second resistor connected between the third terminal and the ground, wherein a node is connected to the third terminal forming an output terminal for outputting the power cutoff signal.

5. A mobile device having an overcurrent cutoff function and at least one function module, the mobile device comprising:
    a main power supply unit which supplies power to the mobile device;
    a power supply load/unload detection unit which detects a separation of the main power supply unit from the mobile device;
    a control unit having application programs and an operating system which runs the application programs or controls the at least one function module;
    a memory device which stores temporary data during the execution of the application programs and data resulting from the application program executions by the control unit:
    a power control unit which converts the power generated from the main power supply unit into a predetermined voltage and supplies the power to the control unit and the memory device; and
    a backup power supply unit which supplies a backup power to the mobile device when the power from the main power supply unit to the mobile device is detached, and which comprises a backup battery, a DC/DC converter, and a switching unit, wherein the backup power supply unit supplies power from the backup battery to the control unit and the memory device based on the switching unit in response to the backup power supply signal,
    wherein the control unit comprises:
    a flash ROM which stores application programs to drive the at least one function module;
    a microprocessor driven by the application programs, and which communicates data with the at least one function module and applies an output power of the backup power supply unit to the mobile device in response to the power cutoff signal; and a level conversion unit which converts the potential levels of the data lines and control signal lines to a predetermined potential level in response to the power cutoff signal.

6. The mobile device of claim 5, wherein the level conversion unit comprises a switch and a pull-down resistor, wherein the switch is turned on in response to the power cutoff signal.

7. The mobile device of claim 5, wherein the application programs comprise at least one of schedule management programs, multimedia reproducing/recording programs and communication programs.

8. The mobile device of claim 5, wherein the level conversion unit comprises NMOS transistors connected in series between the microprocessor and the at least one function module and which turn on and off in response to the power cutoff signal.

9. The mobile device of claim 5, wherein the level conversion unit converts the potential levels of the data lines and control signal lines connected between the microprocessor and the at least one function module into a logic "low" or a high-impedance state.

10. The mobile device of claim 5, wherein the backup power supply unit supplies the output power necessary to preserve data stored in the memory device and to maintain a standby state of the control unit.

11. The mobile device of claim 9, wherein the at least one function module is a Code Division Multiple Access module.

12. The mobile device of claim 10, wherein the memory device is a Dynamic Random Access Memory.

* * * * *

UNITED STATES PATENT AND TRADEMARK OFFICE
CERTIFICATE OF CORRECTION

PATENT NO. : 7,336,978 B2
APPLICATION NO. : 10/787157
DATED : February 26, 2008
INVENTOR(S) : Ji-sang Kim Page 1 of 1

It is certified that error appears in the above-identified patent and that said Letters Patent is hereby corrected as shown below:

Column 8, Line 43 claim 5, change "unit:" to --unit;--.

Signed and Sealed this

Twenty-ninth Day of July, 2008

JON W. DUDAS
*Director of the United States Patent and Trademark Office*